US005371648A

United States Patent [19]
Bonvallat

[11] Patent Number: 5,371,648
[45] Date of Patent: Dec. 6, 1994

[54] PLUG-IN PROTECTION MODULE FOR A MODULE FOR RAPID INTERCONNECTION OF TELEPHONE LINES

[75] Inventor: Pierre Bonvallat, Cluses, France

[73] Assignee: Pouyet International, France

[21] Appl. No.: 226,836

[22] Filed: Apr. 13, 1994

[30] Foreign Application Priority Data

Apr. 23, 1993 [FR] France .................. 93 05049

[51] Int. Cl.⁵ ............................................. H02H 9/06
[52] U.S. Cl. ............................ 361/119; 361/124; 361/129; 337/32
[58] Field of Search ............... 361/119, 120, 124, 127, 361/129; 337/31, 29, 32

[56] References Cited

U.S. PATENT DOCUMENTS 4,866,561 9/1989 Dorival .................. 361/119
4,876,621 10/1989 Rust et al. .............. 361/119

Primary Examiner—Todd Deboer
Attorney, Agent, or Firm—Parkhurst, Wendel & Rossi

[57] ABSTRACT

This invention relates to a protection module provided to receive an overvoltage arrester in a receptacle and designed to plug on the protection ring of a telephone line interconnection module. The receptacle presents a receiving cavity adapted to receive overvoltage arresters of different dimensions, and it contains three elastic contacts, viz. two line contacts each with two contact strips and an earth contact with contact clamp. A thermofusible insulating shim is inserted between four additional earth lugs and the body of the overvoltage arrester in order to ensure short-circuiting of the latter in the event of functioning due to a lightning strike.

4 Claims, 5 Drawing Sheets

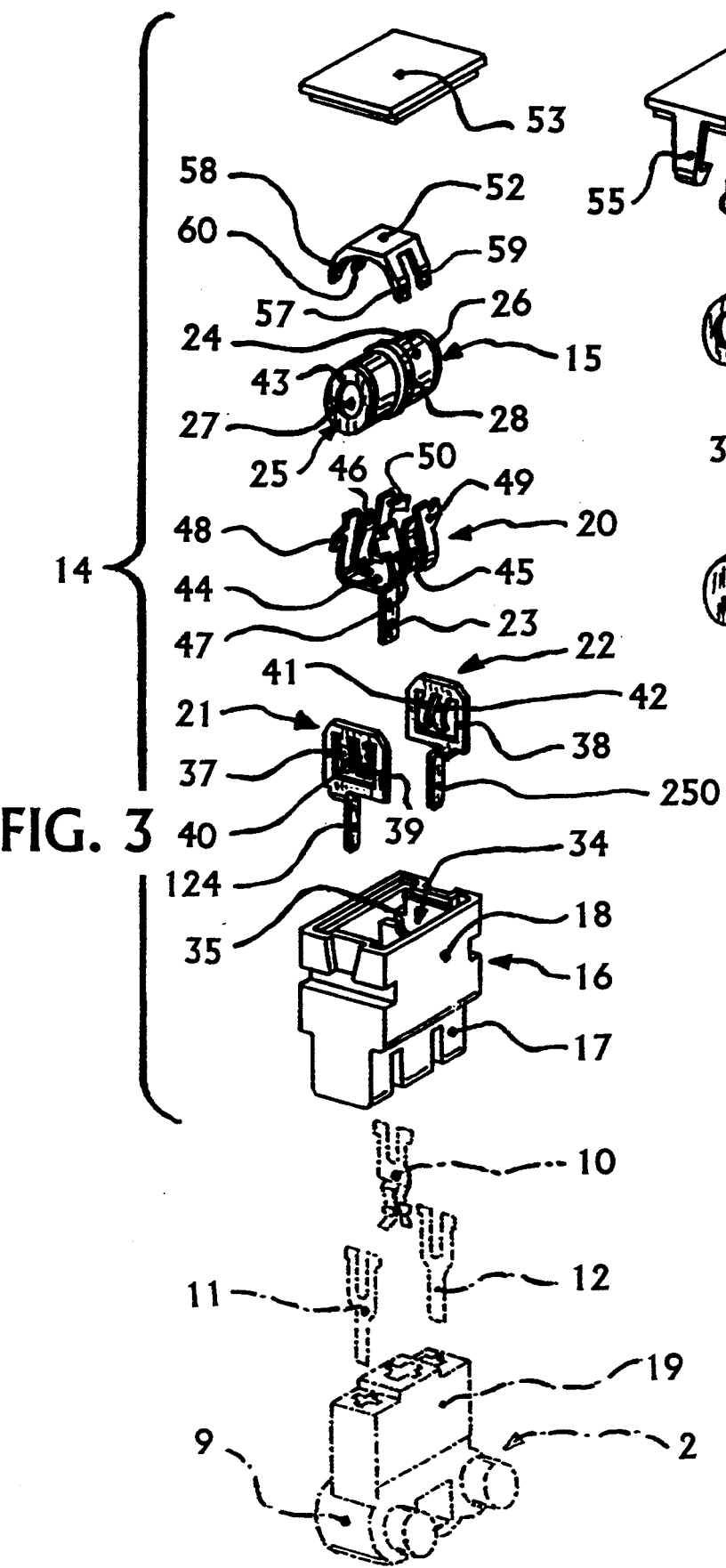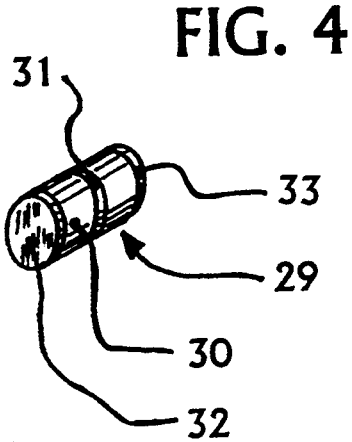

PLUG-IN PROTECTION MODULE FOR A MODULE FOR RAPID INTERCONNECTION OF TELEPHONE LINES

FIELD OF THE INVENTION

The present invention relates to a plug-in protection module for a module for rapid interconnection of telephone lines.

BACKGROUND OF THE INVENTION

FIG. 1 is a view in perspective of a module 1 for rapid interconnection of telephone lines and for protection against lightning or other overvoltages, which is at present marketed by Applicants, while FIG. 2 is an exploded view in perspective of its intermediate half-bushing 2 forming a protection device against lightning or other overvoltages.

It is briefly recalled here that this module 1 is mounted on a preferably standardized metal rail 3 which constitutes an electrical earth connection bar, and that it is constituted by three superposed half-bushings or rings:

- a lower half-bushing 4 which receives the first pair of telephone lines,
- an intermediate half-bushing, called "protection ring" in which is plugged a protection module 5 containing a three-pole lightning arrester or "overvoltage arrester" 6, and
- an upper half-bushing 7 which receives the second pair of telephone wires.

A median screw 8 traverses the assembly of the module 1 and serves both as earth connection and as clamping device ensuring cohesion of the three half-bushings and ensuring self-stripping connections of the four line wires.

The protection ring 2 is composed (FIG. 2) of a body 9 of plastics material which firmly houses three "tuning-fork" contacts, viz. a central double tuning-fork contact 10 which receives the body of the screw 8 and is therefore the earth contact, and two lateral tuning-fork contacts 11 and 12 which are connected to the two line terminals of the module.

The plug-in protection module 5 is composed of a body 13 of plastics material which forms a receptacle for a lightning arrester or overvoltage arrester 6.

This overvoltage arrester 6 is a three-pole lightning arrester found on the market, on the three electrodes of which are soldered three rigid contact lugs 70, 71, 72 which are provided to traverse the bottom of the receptacle 13 so as to plug respectively in the contacts 10, 11, 12 when the module 5 is plugged on the protection ring 2.

After assembly of the protection module 5, the overvoltage arrester 6 is embedded in a polyurethane resin 74 (FIG. 1).

This known device presents drawbacks:

The fact that the overvoltage arrester is embedded in a very rigid polyurethane resin necessitates coating this overvoltage arrester with a layer of a supple product, such as a product based on silicone, in order to allow the fusible device for thermal limitation, which is conventionally interposed between the earth of the lightning arrester and at least one line electrode, to perform its role fully despite the presence of the polyurethane which is rigid. This arrangement increases the cost of this protection module.

An overvoltage arrester, on whose electrodes contact lugs are soldered is not a product available on the market. Consequently, it is not possible for the user to replace the plug-in protection module of the lightning arrester after said lightning or overvoltage arrester has functioned: the whole of the module must be changed, which is relatively expensive.

In addition, this known device is provided to receive an overvoltage arrester of well-determined dimensions, which is inconvenient, as it is then necessary always to be supplied from the same manufacturer of overvoltage arresters.

Finally, this same known device presents another drawback of not lending itself to automatic, robotized manufacture.

It is an object of the invention to overcome the drawbacks set forth hereinabove.

SUMMARY OF THE INVENTION

To that end, it relates to a protection module adapted to be plugged on the protection ring receiving a rapid interconnection module for telephone lines, this ring presenting three terminals for connection, by plugging, to this protection module, viz. one earth terminal and two line terminals, this protection module containing a three-pole lightning or overvoltage arrester with cylindrical body and provided with a metallic earth electrode, median and annular, and with two metallic line electrodes forming the two respective transverse end faces of the cylinder, and being designed to be plugged on this receiving ring so as electrically to connect the two end electrodes of the overvoltage arrester respectively to the two line terminals and the median annular electrode of this overvoltage arrester to the earth terminal, this plug-in protection module being characterized:

- in that it comprises, in a receptacle for receiving the overvoltage arrester, three elastic metal contacts, viz. a median earth connection contact whose transverse section presents the form of a two-tined fork which is provided to receive, between these two tines, the median annular earth electrode of the overvoltage arrester, and two lateral line connection contacts which are respectively positioned on either side of this earth contact and symmetrically with respect to the median transverse plane thereof, each of these two contacts being provided to elastically abut respectively against the two line electrodes of the overvoltage arrester,
- in that the internal dimensions of said receptacle are slightly greater than the average dimensions of an overvoltage arrester available on the market, with the result that, taking into account the clearance allowed by the elasticity of these three elastic contacts, this receptacle is adapted to receive commercially available overvoltage arresters whose external dimensions may be slightly different from one another,
- in that said median elastic earth connection contact is in the form of a cradle which comprises, in the longitudinal direction parallel to the axis of the overvoltage arrester and on either side of each of the two elastic earth connection lugs which form the two tines of said fork, respectively two additional elastic metal lugs which are shaped in order respectively to abut on each of the two line electrodes of the overvoltage arrester, an insulating shim made of thermofusible material being, in addition, provided to be inserted between each of these four additional elastic lugs and the body of the overvoltage arrester in order, by application of a well known general means, normally to form an electrically insulating gap, generally an air gap, between each additional lug and its conjugate line electrode of the overvoltage arrester, this insulating gap being eliminated when, the overvoltage arrester having just functioned, this insulating shim then melts under the effect of the heat, and in that this thermofusible shim comprises four adjusting tabs which are respectively adapted to fit, when said shim is positioned, between each of said additional elastic metal lugs.

Each of these two elastic line contacts preferably comprises two elastic contact strips which are spaced apart from each other and shaped to abut on the peripheral part of the metallic transverse end face of the cylinder formed by the body of the overvoltage arrester, i.e. on the peripheral part of the transverse face of the corresponding line electrode of the overvoltage arrester, so that this receptacle may receive both commercially available overvoltage arresters, for which this metallic transverse end face is strictly flat, and commercially available overvoltage arresters for which this metallic transverse end face presents a hollow central part.

BRIEF DESCRIPTION OF THE DRAWINGS

The invention will be more readily understood on reading the following description with reference to the accompanying drawings, in which:

FIG. 3 is an exploded view in perspective of a protection module according to the invention adapted to be plugged on a protection ring of a telephone line interconnection module.

FIG. 4 illustrates a variant embodiment.

FIG. 5 is modified in the case of the variant of FIG. 4.

FIG. 8 is modified in the case of the variant of FIG. 4.

DESCRIPTION OF PREFERRED EMBODIMENT

Figure 1:
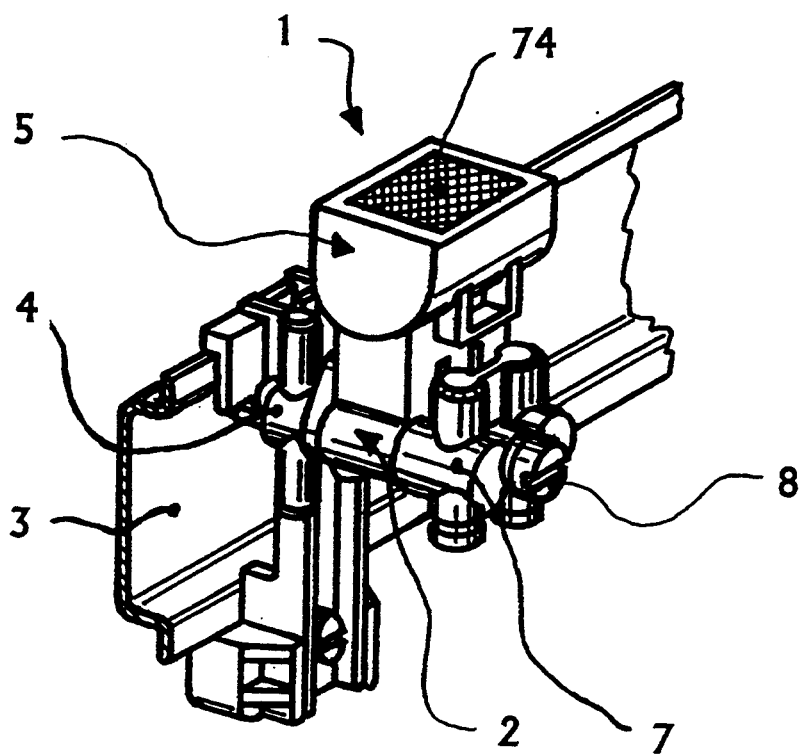
FIGS. 1 and 2 have already been described in the preamble.
Figure 2:
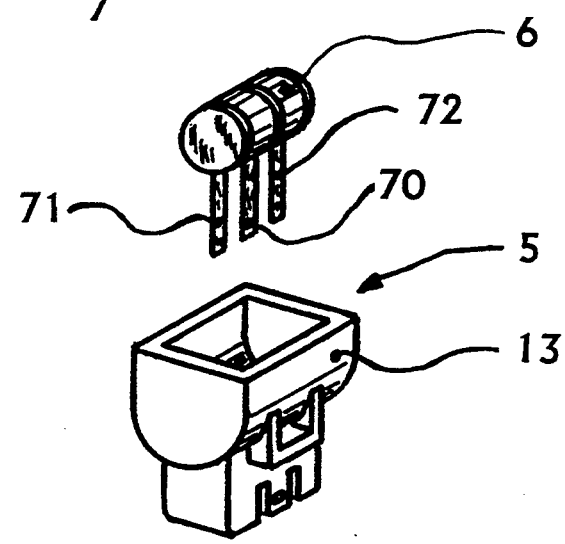

Referring again to the drawings, reference will now be made to FIGS. 3, 5, 7, 9 and 10 showing a protection module 14 which is provided to receive a commercially available three-pole lightning or overvoltage arrester 15 and to be plugged on a receiving protection ring 2 of a telephone line interconnection module such as module 1 of FIG. 1.

This ring 2 is composed of an insulating body 9 and of three tuning-fork contacts, viz. two lateral line contacts 11, 12 and a median earth contact 10.

This novel protection module 14 comprises a body 16 made of rigid insulating plastics material, of which the lower part 17 is hollow and designed to be firmly plugged on the conjugate male part formed by the upper part 19 of the body 9 of the ring 2, and whose upper part 18 is also hollow and forms a receptacle, here of horizontal and rectangular section, for the overvoltage arrester 15.

This receptacle 18 contains a median elastic earth contact 20 and two elastic line contacts 21, 22 which all three present a rigid vertical lower lug 23, 124 and 250 respectively, these three lugs traversing the body 16 to plug respectively, when the female part 17 is in place on its conjugate male part 10, in the tuning-fork contacts 10 to 12. The line contacts 21 and 22 are disposed on either side of the earth contact 20, and symmetrically with respect to the median transverse plane 61 thereof.

The three-pole overvoltage arresters may be of slightly different dimensions and designs. For example, as is the case for the overvoltage arrester 15, it may be question of a lightning arrester whose externally insulating cylindrical body 24 is provided with a metallic, median, annular earth electrode 28 which is very much in relief with respect to this cylinder 24 and with two line electrodes 25, 26 respectively covering the two transverse end faces of the cylinder 24 and each presenting the form of a hollow metallic dish, therefore having a central recess 27. As designated by reference 29 in FIG. 4, the lightning arrester has an whose externally insulating cylindrical body 30 is provided with a metallic, median, annular earth electrode 31 which is only very slightly in relief and with two line electrodes 32 and 33 respectively covering the two transverse end faces of the cylinder 30 and each presenting the form of a metal dish with a strictly flat bottom.

The internal dimensions of the receptacle 18 are slightly greater than the average external dimensions of a commercially available overvoltage arrester, such as for example conventional overvoltage arresters 29 and 15. To give an idea, with respect to a commercially available overvoltage arrester 29, whose length is about 10 millimeters for a diameter of 8 millimeters, the internal cavity 34 of the receptacle 18 will, once this overvoltage arrester is centred in this cavity, leave about 3 millimeters on either side on the longitudinal direction and about 2 millimeters on either side in the transverse direction, which leaves ample room for other models of overvoltage arresters of larger dimensions.

This receiving cavity 34 is made much deeper than is simply necessary for receiving an overvoltage arrester, in order to be able to give contacts 20, 21, 22 a sufficient height to obtain a good elasticity of their contact strips. In order to avoid the overvoltage arrester falling in the bottom of this cavity 34, from which it would be very difficult to extract, there are provided, moulded with the plastic block 16, at least two retaining bows 35, 36 which are prominent in the bottom of the cavity 34 and which form an insulating cradle for the overvoltage arrester.

Each metallic line contact 21, 22 comprises an upper part formed by a frame 37 and 38, respectively, which itself bears two contact strips 39, 40 and 41, 42 respectively, which are elastic and slightly protuberant towards the inner part of the cavity 34 which receives them against its small, lateral faces, in the present case vertical.

These two elastic strips each present a width of the order of 2 millimeters, and are spaced apart from one another by about 2 millimeters. In the case of using an overvoltage arrester such as overvoltage arrester 15 whose line electrodes 25 are in the form of a dish with a central hollow 27, there is thus assurance that the two elastic strips 39, 40 abut against the annular periphery 43 of this electrode 25; this contact 21 is therefore suitable for the two types of overvoltage arrester, 15 and 29. In addition, the fact of providing two bearing strips 39, 40 by contact instead of one sole, creates a better distribution of the bearing zones and consequently a better capacity of flow in current waves.

The elastic, metallic, earth connection contact 20 is very particular. Its upper part, which is provided to rest on the bottom of the cavity 34, forms of a cradle composed of a rigid bottom 3. The cradle is horizontal and bordered, in the longitudinal direction, by two identical assemblies, here vertical, of three elastic arms, very slightly spaced apart form one another. The elastic arms includes a median arm, 45 and 46 respectively, and two lateral arms 47, 48 and 49, 50 respectively, which are placed, in the longitudinal direction, on either side of this median arm.

Figure 9:
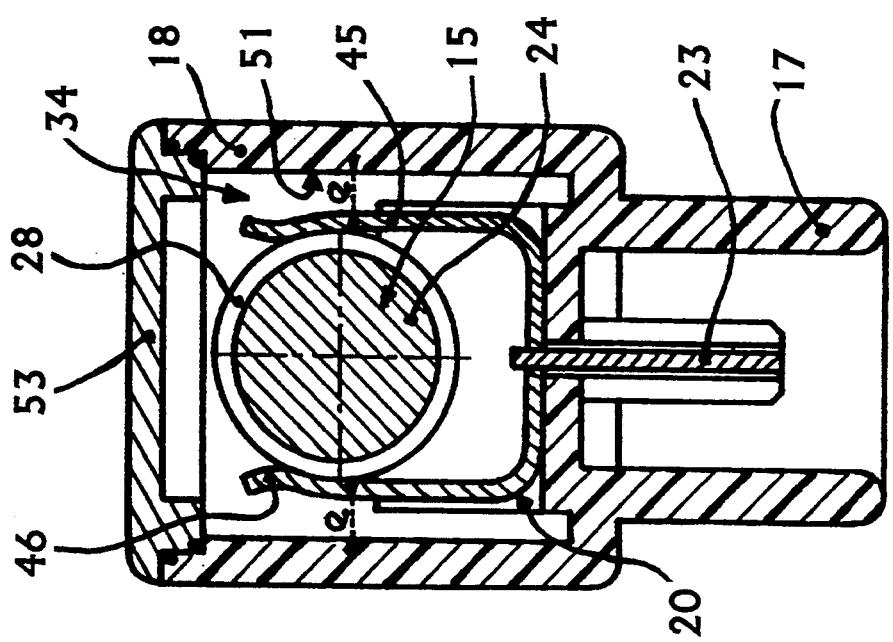
FIG. 9 is a transverse section of the module of FIG. 3, made along IX—IX of FIG. 5.

In transverse section at the level of the two median arms 45, 46 and of the lower median lug 23, this elastic contact 20 is in the form of a fork, as seen in particular in FIG. 9. As illustrated in this FIG. 9, these two elastic median arms 45, 46 are provided to form a clamp which closely imprisons the earth electrode 28 of the overvoltage arrester 15 or the earth electrode 31 of the overvoltage arrester 29.

In order to accept commercially available overvoltage arresters of different diameters, each assembly of three arms 47, 45, 49 and 48, 46, 50 leaves, once the overvoltage arrester 15 or 29 is in place in the receptacle 19 (FIG. 9), on each side, a clearance space e of the order of 1.5 to 2 millimeters with respect to the inner wall 51 nearest the receiving cavity 34.

The two lateral arms 47, 49 and 48, 50 respectively are not earth contacts proper, but thermal safety contacts by short circuiting of the overvoltage arrester in the event of it functioning further to a lightning strike on the line or a prolonged contact between a low-voltage line and a telephone line.

According to a general means which is now well known, there is provided an insulating shim 52 of thermo-fusible plastics material which is normally intercalated between each of these metallic arms and connected to earth 47 to 50 and the two line electrodes 26 and 25, or 32 and 33 of the overvoltage arrester 15 or 29. When the overvoltage arrester functions, the high temperature to which its body is taken causes the matter of the shim 52 to melt, so that the arms 47 to 50 come into electrical contact with the line electrode of the overvoltage arrester, which short-circuits the latter.

In the case of the present embodiment, the thermofusible shim 52 comprises four rigid, insulating lugs 57 to 60, which are respectively provided to be intercalated between the metallic elastic lugs 47 and 50. In addition, the metallic lugs 47 and 48 are provided in order, in the absence of their respective insulating spacer shims 57 and 58, to come into electrical contact with a line electrode 25 or 32 of the overvoltage arrester 15 or 29, and in the same way, the metallic lugs 49 and 50 are provided, in order, in the absence of their respective insulating spacer shims 59 and 60, to come into electrical contact with the other line electrode 26 or 33 of the overvoltage arrester 15 or 29.

Finally, this module 14 is provided with a cover 53 for closure, made of rigid plastics material, means being, of course, provided to ensure tight closure.

These sealing means may be very varied and within the scope of the man skilled in the art. For the embodiment of FIGS. 5, 7, 9 and 10, it is, for example, provided to ensure hold and tightness of the cover by a conventional ultra-sound welding process. It is also possible, like the special cover 54 of FIG. 4 and which will be described hereinafter, to provide this cover 53 with clipping lugs 55, 56 on the receptacle 18, and to ensure tightness by filling the cavity 34 with a silicone-based sealing product.

Figure 6:
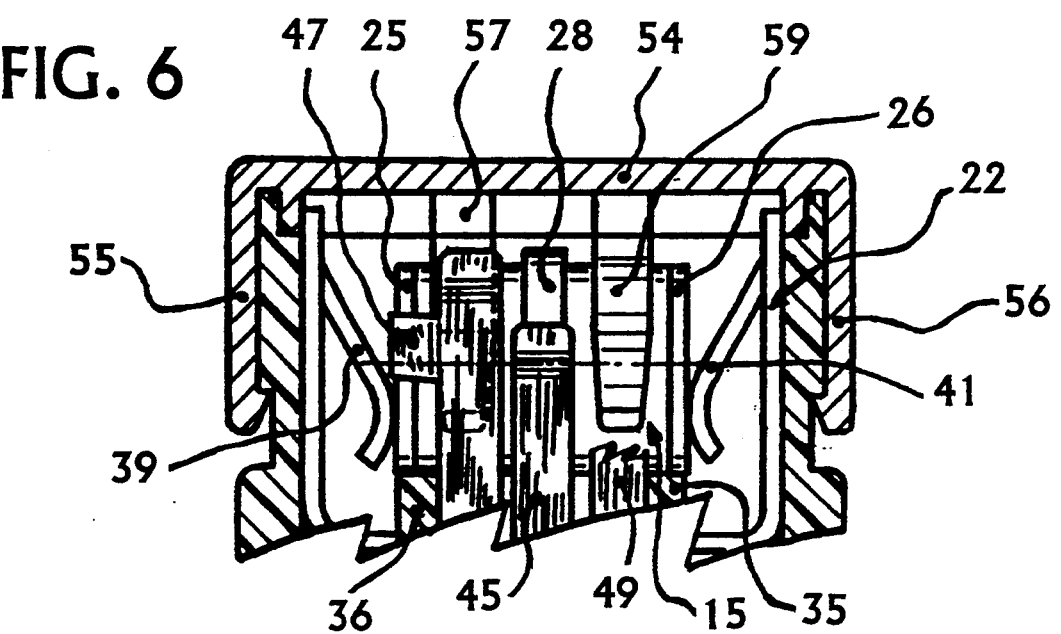
FIG. 6 shows how this
Figure 5:
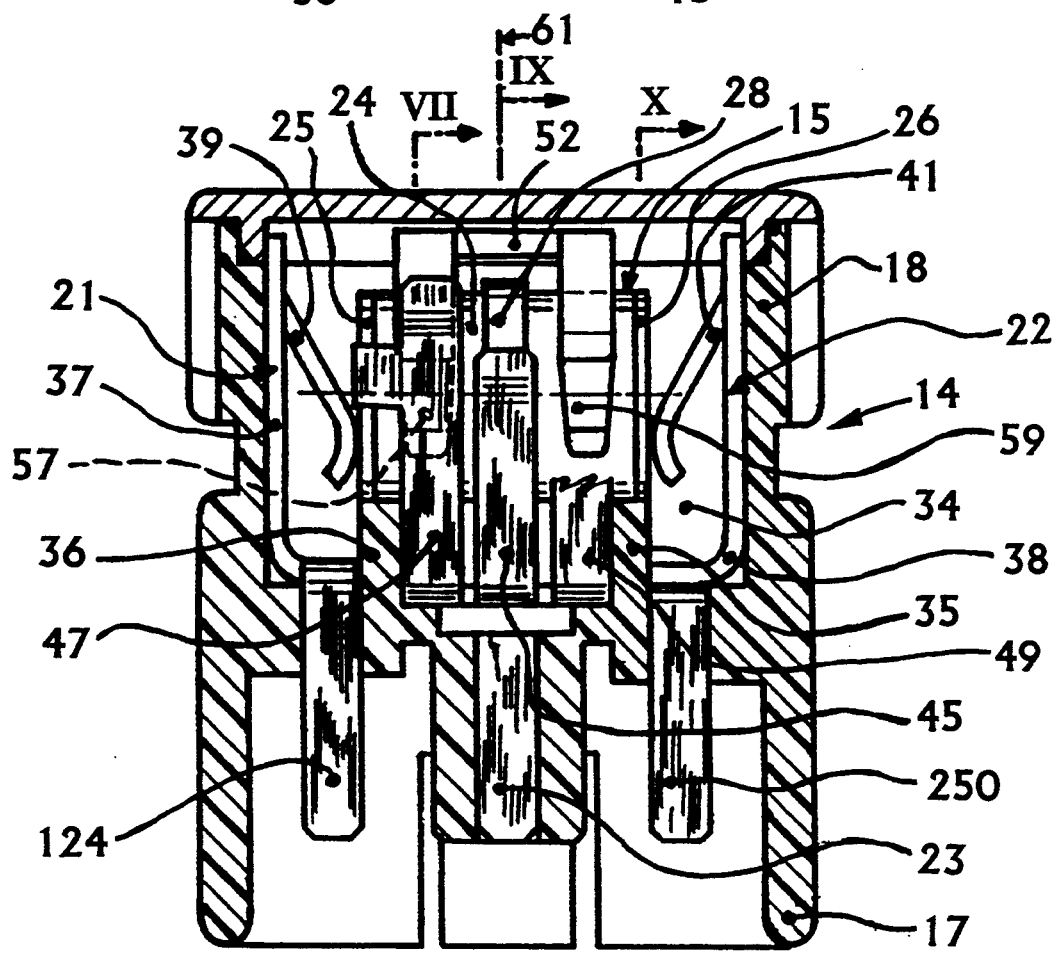
FIG. 5 shows the module of FIG. 3 mounted, in an overall view in longitudinal section.
Figure 8:
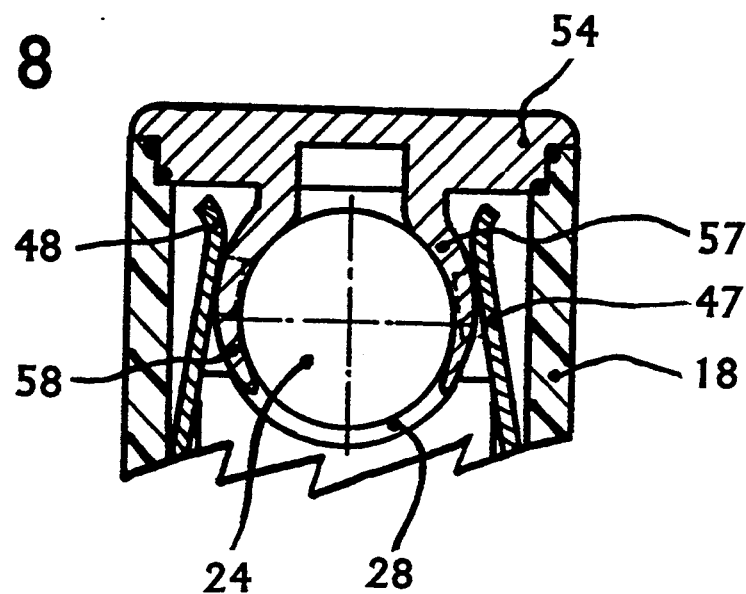
FIG. 8 shows how this
Figure 7:
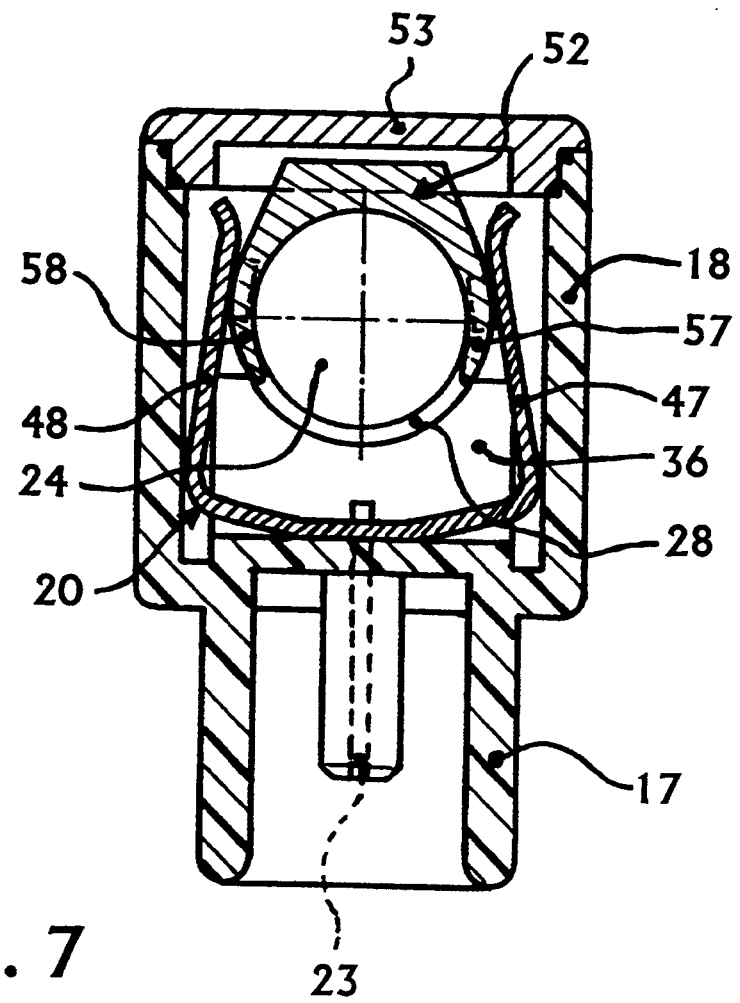
FIG. 7 is a transverse section of the module of FIG. 3 made substantially along VII—VII of FIG. 5.
Figure 10:
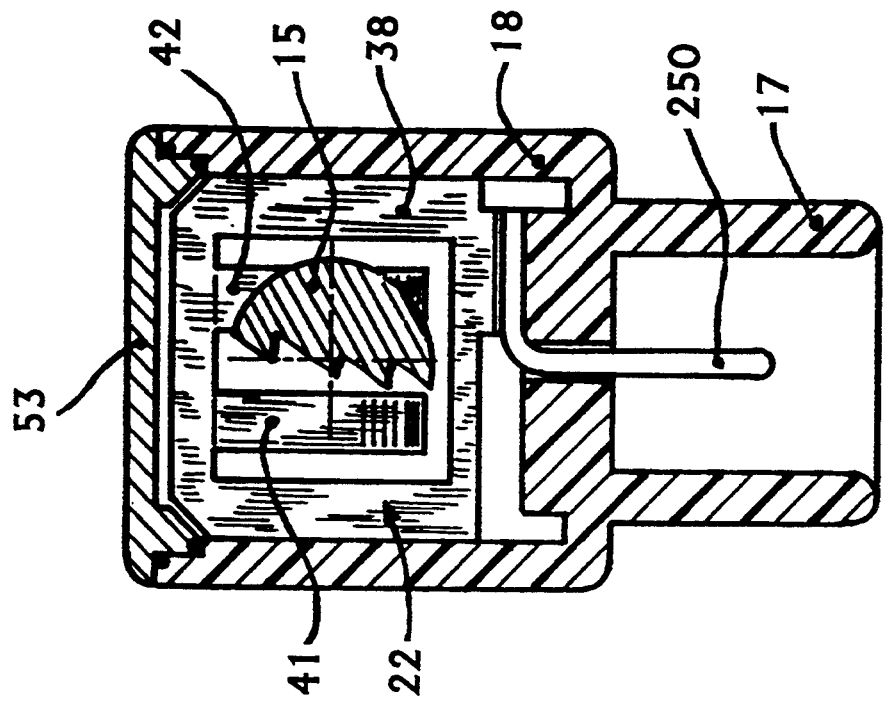
FIG. 10 is a transverse section of this same module, made along X—X of FIG. 5.

Referring now to FIGS. 4, 6 and 8, it is also possible to make shim 52 and cover 53 in one piece, in order to obtain cover 54 which comprises said four spacer lugs 57 to 60 integrated in one piece in the cover for closing the cavity 34.

It goes without saying that the invention is not limited to the embodiment which has just been described, but may be implemented by using various equivalent means. For example, it is not excluded to make the three elastic metallic contacts 20 to 22 in one piece. Likewise, the median contact 20 might not be provided with lateral elastic lugs 47 to 50 and may present only the two median lugs 45 and 46: in such a case, it is possible either to use an overvoltage arrester already provided with a short-circuiting device, or not to use a short-circuiting device in this protection module 14, or to use a short-circuiting device of another type.

What is claimed is:

1. A protection module adapted to be plugged on a protection ring of an interconnection module for telephone lines, the protection ring having three terminals, including an earth terminal and two line terminals, said protection module containing an overvoltage arrester having a cylindrical body, two metallic line electrodes forming two respective transverse end faces of the cylindrical body, and an annular metallic earth electrode disposed on said cylindrical body and between the two line electrodes, said protection module being designed to connect the two line electrodes and the earth electrode of the overvoltage arrestor respectively to the two line terminals and the earth terminal of the protection ring, said protection module comprising:
   a receptacle for receiving the overvoltage arrester, said receptacle having internal dimensions slightly greater than average external dimensions of a commercially available overvoltage arrester, thereby to allow reception of numerous commercially available overvoltage arresters having differing external dimensions;
   a cradle-shaped median earth connection contact for receiving the overvoltage arrester in said receptacle, said earth connection contact forming a two-tined fork in transverse section for elastically abutting the earth electrode of the overvoltage arrester, the two tines comprising two elastic earth connection lugs, said cradle-shaped median earth connection contact further including first and second pairs of elastic metal lugs on either side of the two elastic earth connection lugs;
   an insulating shim comprised of thermofusible material for melting due to application of an overvoltage to the overvoltage arrester, said insulating shim comprising first and second pairs of tabs adapted to be interposed between respective first and second pairs of said elastic metal lugs and the line electrodes of the overvoltage arrester, such that said first and second pairs of elastic metal lugs elastically abut against respective first and second pairs of tabs;
   two lateral line connection contacts positioned to abut respectively against the two line electrodes of the overvoltage arrester.

2. The protection module of claim 1, further comprising a cover for covering said receptacle, said insulating shim being integral with said cover.

3. The protection of module of claim 1, wherein each of the two line connection contacts comprises two contact strips which are spaced apart from each other and adapted to abut an outer peripheral portion of a respective line electrode of the overvoltage arrester, such that the receptacle may receive commercially available overvoltage arresters which have flat or hollow transverse end faces.

4. The protection module of claim 1, wherein said receptacle has a depth greater than a diameter of the overvoltage arrester, such that said two contact strips have good elasticity, said receptacle comprising an insulating cradle comprised of at least two retaining bows for receiving the overvoltage arrester and preventing passage of the overvoltage arrester to a bottom portion of the receptacle.

* * * * *